United States Patent Office 3,395,128
Patented July 30, 1968

3,395,128
THERMOPLASTIC COPOLYMERS DERIVED FROM DIGLYCIDYL ETHER OF 1,4-CYCLOHEXANEDI-METHANOL
Warren F. Hale, Somerville, and Norman H. Reinking, Millington, N.J., assignors to Union Carbide Corporation, a corporation of New York
No Drawing. Filed June 14, 1963, Ser. No. 287,786
4 Claims. (Cl. 260—77.5)

This invention relates to novel diglycidyl ethers. More particularly it relates to the diglycidyl ether of 1,4-cyclohexanedimethanol. In another aspect the invention relates to polymers derived from the diglycidyl ether of 1,4-cyclohexanedimethanol.

Many glycidyl ether polymers are known to lack sufficient flexibility, toughness, elasticity, tensile strength, solvent resistance or gas impermeability to meet the rigorous standards of such commercial applications as films, coatings, laminates, molded or extruded structural articles, and the like.

It is an object of this invention to provide novel diglycidyl ethers. It is another object to provide thermoplastic and thermoset polymers prepared from these novel diglycidyl ethers which exhibit physical and chemical properties sufficient for commercial use.

It has now been found that diglycidyl ethers may be synthesized from 1,4-cyclohexanedimethanol. It has further been found that thermoplastic and thermoset polymers possessing superior physical and chemical properties can be prepared from the diglycidyl ether of 1,4-cyclohexanedimethanol.

The cyclohexyl and aliphatic ether moieties of the diglycidyl ether of 1,4-cyclohexanedimethanol serve to lower the glass transition temperature and enhance the toughness and flexibility of polymers made therefrom. Their combined effect is reflected in greater tensile and impact strength and elasticity in these polymers. The values for these physical constants lie well within the range of commercial utility.

Diglycidyl ether of 1,4-cyclohexanedimethanol

The preparation of the diglycidyl ether of 1,4-cyclohexanedimethanol is illustrated by the typical reaction sequence shown below.

Step 1

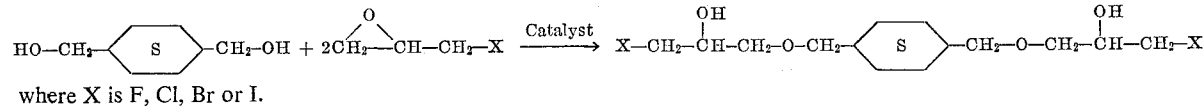

where X is F, Cl, Br or I.

Step 2

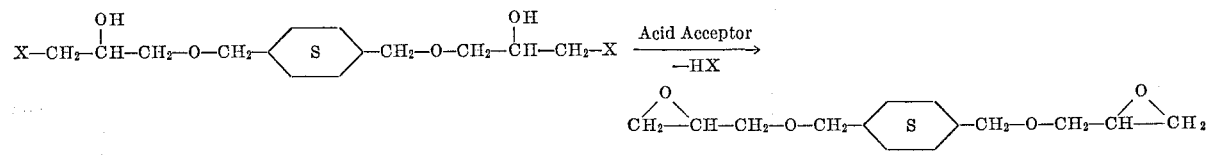

wherein X is as previously identified.

In the first step, 1,4-cyclohexanedimethanol is reacted with an epihalohydrin in the presence of an acidic catalyst, to form the dihalohydrin intermediate. For this purpose Lewis acids such as halides of Groups III–A and VIII elements of the Deming periodic table (Handbook of Chemistry and Physics, pages 392 and 393, 35th Edition, 1953, Chemical Rubber Publishing Co., Cleveland, Ohio), e.g., boron trifluoride, aluminum trichloride and iron trichloride are particularly useful. Either the cis or trans isomers of 1,4-cyclohexanedimethanol or mixtures of both may be used. When the term 1,4-cyclohexanedi-methanol is used hereafter it includes both cis and trans isomers and mixtures thereof.

Various epihalohydrins such as epichlorohydrin, epibromohydrin, epiiodohydrin and substituted epihalohydrins such as chloroisobutylene oxide and the like, may be used as the co-reactant with 1,4-cyclohexanedimethanol in the preparation of the diglycidyl ether. The reaction can be carried out in the melt or in the presence of a variety of inert liquid diluents, such as aromatic hydrocarbons, e.g., benzene, toluene and xylenes; aliphatic hydrocarbons, e.g., hexane, heptane and octane; ketones e.g., acetone, methyl ethyl ketone and methyl isobutyl ketone; water; ethers, e.g., diethyl ether, dibutyl ether, dioxane and tetrahydrofuran; halogenated hydrocarbons, e.g., carbon tetrachloride, trichlorethylene and tetrachloroethane; and the like.

The qualities of diol and epihalohydrin in the reaction vessel should be such that at least two moles of epihalohydrin are present for each mole of 1,4-cyclohexanedimethanol. The amount of diluent, if any, can be varied to give concentrations of from 5% to 90% solids. The catalyst concentration generally ranges between 0.01% and 5% by weight based on the diol. The reaction temperature usually ranges between 50° C. and 190° C. depending on the solvent used and the pressure. Pressures above atmospheric are not necessary but may be employed as can less than atmospheric pressures. The reaction time required for the formation of the dihalohydrin will vary with the reaction temperature but ordinarily reaction times of 2 to 30 hours at 50° C. to 190° C. are used.

The second step of the diglycidyl ether preparation requires the use of a dehydrohalogenating agent to effect the conversion of dihalohydrin to diglycidyl ether in accordance with the equation shown above. Acid acceptors, for example, sodium hydroxide, tertiary amines, sodium aluminate and like compounds well known in the art to serve as dehydrohalogenating agents are used.

The conversion of the diglycidyl ethers of 1,4-cyclohexanedimethanol to thermoset resins may be effected by methods well known in the epoxy resin curing art, thus facilitating their use with conventional equipment presently employed by fabricators using epoxy resins. These diglycidyl ethers may be cured or hardened by reaction with organic acids, organic acid anhydrides and primary, secondary and tertiary amines, preferably in approximately stoichiometric amounts. Examples of suitable curing agents include oxalic acid, phthalic anhydride, hexahydrophthalic anhydride, pyromellitic anhydride, chlorendic anhydride, maleic anhydride, ethylene diamine, diethylene triamine, triethylene tetramine, dimethylamine, propylamine, boron trifluoride monoethylamino complexes, hydroxyethyl diethylene triamine, piperidine, α-methylbenzyl dimethylamine, tridimethyl amino methyl phenol, metaphenylene diamine and the like. The curing conditions, viz, proportions of reactants, curing time and curing temperature depend on the curing agent used. In general, curing times of 5 minutes to 4 days and temperatures from 25° C. to 250° C. are employed. Room temperature cures in 3 to 6 hours may be achieved with polyfunctional amines while carboxylic acid cures require temperatures of 100 to 150° C. for complete reaction in 3 to 6 hours.

The thermoset resin obtained by the amine cure of the diglycidyl ether of 1,4-cyclohexanedimethanol has been found to be insoluble in such solvents as methanol, ethanol, hexane, heptane, tetrahydrofuran, ether, acetone, dioxane, chloroform, carbon tetrachloride, benzene, toluene, dimethylsulfoxide and other common solvents even after immersion for 20 days. The toughness of this hard, pale yellow resin was demonstrated by dropping a 16 ounce hammer through a distance of 4 feet onto the resin supported on a concrete slab. The specimen was essentially unaffected after 10 such impingements.

A wide variety of thermoplastic polymers may be prepared from the diglycidyl ether of 1,4-cyclohexanedimethanol by reaction of its epoxy groups with difunctional compounds containing active hydrogens. These polymers can be thermoformed into many useful articles as well as sheets, films, tubes and so forth. They can be used in such fabricating techniques known in the art as blow molding, pressure molding, injection molding, solvent casting and the like. A typical example is the reaction product of the diglycidyl ether of 1,4-cyclohexanedimethanol with hydroquinone as represented by the structure

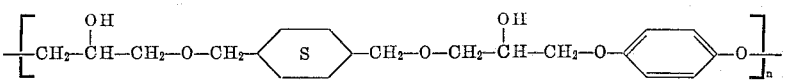

wherein $n$ is an integer having values of 30 to 80, or more. A list of other dihydric phenolic compounds which can be used in this reaction include dihydric mononuclear phenols such as resorcinol, methyl resorcinol and catechol as well as dihydric polynuclear phenols having the formula:

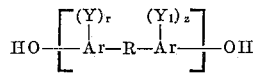

wherein Ar is an aromatic or alicyclic group and preferably phenylene, Y and $Y_1$ which can be the same or different are alkyl groups, preferably having from 1 to 4 carbon atoms, halogen atoms, i.e., fluorine, chlorine, bromine or iodine, or alkoxy radicals preferably having from 1 to 4 carbon atoms, $r$ and $z$ are integers having a value from 0 to 4 and R is a bond between adjacent carbon atoms as in dihydroxydiphenyl or is a divalent radical including for example

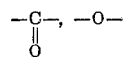

—S—, —SO—, —$SO_2$—, and —S—S— and divalent hydrocarbon radicals such as alkylene, alkylidene, cycloaliphatic, halogenated, alkoxy, aryloxy or carboxy substituted alkylene, alkylidene and cycloaliphatic radicals as well as alkarylene and aromatic radicals and a ring fused to an Ar group.

Examples of specific dihydric polynuclear phenols include among others: the bis-(hydroxyphenol) alkanes such as 2,2-bis-(4-hydroxyphenyl)propane,
2,4′-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorphenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis(4-hydroxyphenyl)-1-phenyl-propane,
and the like;

di(hydroxyphenyl)sulfones such as bis-(4-hydroxyphenyl)-sulfone,
2,4′-dihydroxydiphenyl sulfone,
5′-chloro-2,4′-dihydroxydiphenyl sulfone,
5′-chloro-4,4′-dihydroxydiphenyl sulfone,
and the like;

di(hydroxyphenyl)ethers such as bis-(4-hydroxyphenyl)-ether,
the 4,3′-, 4,2′-, 2,2′-, 2,3′-, dihydroxydiphenyl ethers,
4,4′-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxydiphenyl)-ether,
4,4′-dihydroxy-3,6-dimethoxydiphenyl ether,
4,4′-dihydroxy-2,5-diethoxydiphenyl ether,
and the like.

A preferred form of the thermoplastic polymer of the diglycidyl ether of 1,4-cyclohexanedimethanol is one in which the dihydric polynuclear phenol has the formula

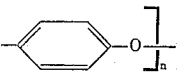

where Y, $Y_1$, $r$ and $z$ are as previously defined, and $R_1$ is a divalent saturated aliphatic hydrocarbon radical, particularly alkylene and alkylidene radicals having from 1 to 5 carbon atoms and cycloalkylene radicals having up to and including 10 carbon atoms.

A specific example is described below in which 2,2-bis-(4-hydroxyphenyl)propane (sold commercially as bisphenol A) was used as the dihydric polynuclear phenol to form a thermoplastic polymer with the diglycidyl ether of 1,4-cyclohexanedimethanol. The general utility in the plastics field of the polymer obtained is demonstrated by the physical properties of the product including such data as a Tg (glass transition temperature) of 60° C., a tensile strength of 6,000 p.s.i., a tensile modulus of 216,000 p.s.i., an elongation of 10 to 60%, a pendulum impact of 30 ft. lbs./in.³ and a melt flow of 33.4 decigrams per minute at 44 p.s.i. and 220° C. Clear, water-white, strong, self-supporting films were obtained readily by compression molding. The above data and observations demonstrate the utility of this thermoplastic resin in the fields of injection and compression molding.

When the difunctional comonomer is a diamine the repeating unit of the thermoplastic polymer formed with 1,4-cyclohexanedimethanol is

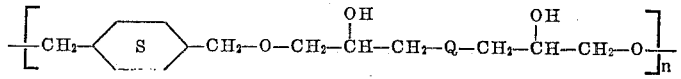

wherein $n$ is an integer having values of 30 to 80 or more and Q is a divalent aliphatic diamine radical containing from 2 to 20 carbon atoms, a divalent cycloaliphatic diamine radical containing from 4 to 10 carbon atoms, a cycloaliphatic urea, or a heterocyclic urea.

With a simple aliphatic diamine such as ethylenediamine the repeating unit is

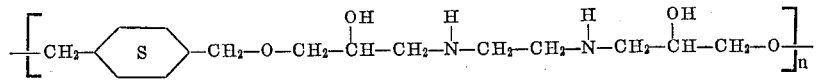

where $n$ is as defined above.

Particularly desirable diamines contain the piperazine structure or preferably a linear piperazine carbonyl structure. A specific example given below utilizes dicarbonyl tripiperazine as the diamine. The resultant thermoplastic polymer had as the repeating unit

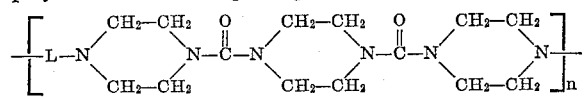

wherein $n$ is an integer having values of 2 to 80 and L is the radical residuum of the diglycidyl ether of 1,4-cyclohexanedimethanol. This polymer exhibited excellent physical properties as shown by a Tg of 50° C., tensile strength of 3700 p.s.i., tensile modulus of 160,000 p.s.i., and elongation of 45%, a pendulum impact strength of 28 ft. lbs./in.³ and a melt flow of 0.96 decigram per minute at 220 p.s.i. and 240° C. Clear, strong, flexible, self-supporting films were prepared by compression molding and displayed excellent gas barrier properties.

Another class of difunctional compounds which may be used for the preparation of thermoplastic polymers with the diglycidyl ethers of 1,4-cyclohexanedimethanol consists of the dimercaptans represented by the general formula

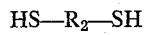

wherein $R_2$ is a divalent aliphatic group containing 2 to 20 carbon atoms, a cycloaliphatic group containing 3 to 12 carbon atoms, an aromatic group or a heterocyclic group.

Another class of difunctional compounds which may be used in the formation of thermoplastic polymers consists of dibasic acids represented by the general formula

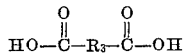

wherein $R_3$ is a valence bond, a divalent aliphatic group containing 1 to 22 carbon atoms, a cycloaliphatic group containing 4 to 12 carbon atoms, an aromatic group, an alkaryl group or a heterocyclic group.

Illustrative aliphatic dibasic acids are oxalic, malonic, succinic, glutaric, adipic, pimelic, suberic, azelaic and sebacic acid. Suitable olefinic dibasic acids include maleic and fumaric acids.

Preferred aromatic dibasic acids include terephthalic acid, isophthalic acid, phthalic acid, 2,2'-diphenyldicarboxylic acid, 3,3'-diphenyldicarboxylic acid, 4,4'diphenyldicarboxylic acid and 2,2-bis(4-carboxyphenyl)propane.

In general, the repeating unit of the 1,4-cyclohexanedimethanol diglycidyl ether copolymer with a difunctional compound containing active hydrogens is given by the formula

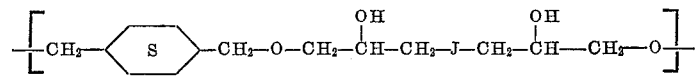

wherein J represents the groups —O—Ar—O—, —O—Ar—R''—Ar—O—

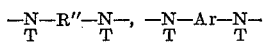

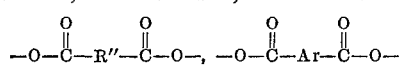

and Ar is an aromatic or alicyclic group; R'' is a divalent aliphatic and cycloaliphatic group, a divalent radial including for example

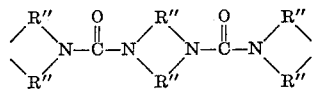

—O—, —S—, —SO—, —SO$_2$— and —S—S— or a bond between adjacent carbon atoms; T is hydrogen or an aliphatic group; X is a tetravalent polyurea as for example

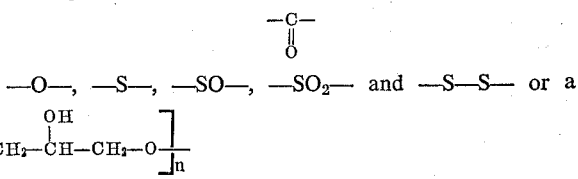

Melt flow was determined by weighing in grams the amount of thermoplastic 1,4-cyclohexanedimethanol diglycidyl ether copolymer that flowed through an orifice having a diameter of 0.0825 inch and a length of 0.315 inch over a 10 minutes period either at a temperature of 220° C. and under a pressure of 44 p.s.i., or at a temperature of 240° C. and under a pressure of 220 p.s.i.

Reduced viscosity as used herein was determined by dissolving a 0.2 gram sample of thermoplastic 1,4-cyclohexanedimethanol diglycidyl ether copolymer in solvent contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald viscometer at 25° C. Reduced viscosity values were obtained from the equation:

$$\text{Reduced viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution. The thermoplastic polymers of this invention have reduced viscosity values in the range of 0.2 to 8.

Glass transition temperatures, commonly referred to as second order phase transition temperatures, refer to the inflection temperatures found by plotting the resilience (recovery from 1 percent elongation) of a film ranging in thickness from 3–15 mils against the temperature. A detailed explanation for determining resilience and inflection temperature is to be found in an article by Alexander Brown in "Textile Research Journal" volume 25, 1955, at page 891.

Pendulum impact was measured by ASTM D–256–56 modified as follows: A steel pendulum was used, cylindrical in shape with a diameter of 0.85 inch and weighing 1.562 pounds. The striking piece, mounted almost at the top of the pendulum was a cylinder 0.3 inch in diameter. Film specimens, 1.5 inches long, 0.125 inch wide and about 0.01 inch thick were clamped between the jaws of the tester so that the jaws were spaced 1 inch apart. The 0.125 inch width of the film was mounted vertically.

The pendulum was raised to a constant height to deliver 1.13 foot pounds at the specimen. When the pendulum was released the cylindrical striking piece hit the specimen with its flat end, broke the film, and traveled to a measured height beyond. The difference between the height traveled with no film present and the height traveled with film present was converted to energy in foot-pounds. On dividing this value by the volume of that portion of the sample located between the jaws of the tester, the tensile impact strength in foot-pounds per cubic inch was obtained.

The following examples illustrate the preparation of the diglycidyl ethers of 1,4-cyclohexanedimethanol together with thermoset and thermoplastic polymers derived therefrom. All parts and percentages herein are by weight.

Example 1.—Diglycidyl ether of 1,4-cyclohexanedimethanol

A three-neck, one-liter round bottom flask equipped with a mechanical stirrer, a thermometer, a Dean-Stark trap and a condenser was charged with 144.2 g. (1.0 mol) of 1,4-cyclohexanedimethanol (approximately 70% trans- and 30% cis-isomer) and 250 g. of toluene. The stirred mixture was heated to reflux and 25 ml. of distillate collected in the Dean-Stark trap. The trap was then removed and the solution cooled under a dry nitrogen atmosphere. After the dried solution had cooled to 35° C., 1.15 g. of boron trifluoride etherate was charged and allowed to mix for 10 minutes. Dropwise addition of 205.0 g. (2.1 moles) of epichlorohydrin (95% pure) was then carried out over a two hour period. During this addition period the exotherm raised the reaction mixture to 70° C. After stirring for 12 hours without the external application of heat, the mixture was refluxed for 8 hours (115° C.) and then allowed to cool to room temperature (25° C.). A solution of 88.0 g. (2.2 moles) of sodium hydroxide in 88.0 grams of water was added dropwise over 45 minutes, then 40 ml. of ethanol was added and the mixture refluxed for two hours. After cooling, the toluene solution was decanted from the solid sodium chloride and washed three times with 700 ml. portions of hot water. The washed toluene solution was distilled through a 10-inch Vigreux column until a head temperature of 50° C. at 4 mm. pressure had been reached. The crude residue was rapidly distilled and a main liquid fraction boiling at 147–167° C. at 0.25 mm. ($n_D^{27}$=1.4742) was collected. This main fraction weighed 90.0 g. and gave an epoxy assay of 146 g. of sample per epoxy unit (i.e., 88% diglycidyl ether of 1,4-cyclohexanedimethanol or 32% yield from the starting diol). Careful redistillation of the main fraction gave a liquid sample boiling at 135° C. at 0.12 mm. ($n_D^{20}$=1.4744) which was found to be 96% pure diglycidyl ether of 1,4-cyclohexanedimethanol by epoxy assay. The infrared spectrum of this sample showed essentially no absorption in the hydroxyl region of 2.75–3.25 microns.

Example 2.—Thermoset resin from the diglycidyl ether of 1,4-cyclohexanedimethanol A test tube was charged with 1.46 g. (0.0050 mole) of diglycidyl ether of 1,4-cyclohexanedimethanol (epoxy assay 146) and 0.24 g. (0.00165 mole) of triethylene tetramine. The mixture was stirred and then allowed to stand until solid. A hard, tough, very light yellow resin was produced which was found to be insoluble in all solvents (e.g., dimethylsulfoxide) even after immersion for 20 days. As a demonstration of toughness, the thermoset resin was struck repeatedly with a 16 ounce hammer dropped from a height of 4 feet onto the resin sample supported by a concrete slab. The resin sustained ten such impacts without noticeable failure.

Example 3.—Thermoplastic polyhydroxyether from diglycidyl ether of 1,4-cyclohexanedimethanol and bisphenol A A three-neck, round-bottom, 100 ml. flask equipped with a thermometer, mechanical stirrer, silica gel column and a condenser was charged with 11.2 g. (0.0490 mole) of bisphenol A, 0.38 g. (0.0020 mole) of the disodium salt of bisphenol A (as the hexahydrate), 13.4 g. (0.0502 mole) of diglycidyl ether of 1,4-cyclohexanedimethanol and 25.0 g. of o-dichlorobenzene which had been previously dried over molecular sieves. The mixture was stirred at room temperature for two hours and then heated to reflux. After the small amount of water had been removed by the silica gel column, the clear solution was refluxed (180° C.) for 30 minutes. The viscous solution was cooled, 20 ml. of chloroform added to reduce the viscosity of the mixture and the polymer isolated as a white solid by precipitation with excess cold isopropanol. The polymer was washed with additional portions of isopropanol in a Waring Blendor to yield a white powder which after vacuum drying at 80° C. for 16 hours weighed 18.0 g. (72% yield). A 0.2% solution of the polymer in tetrahydrofuran had a reduced viscosity of 0.40 at 25° C. Clear, water-white films were easily compression molded from the powder at 90° C. at 10,000 p.s.i. The following properties were measured to indicate the tough, impact-resistant nature of this thermoplastic polyhydroxy ether of bisphenol A:

Glass transition temperature _____° C__ 60
Tensile modulus (ASTM D882–56T) ___p.s.i__ 216,000
Tensile strength (ASTM D882–56T) ___p.s.i__ 6,000
Elongation to break (ASTM D882–56T)
 percent__ 10–60
Pendulum impact (ASTM D256–56 modified)
 ft. lbs./in.$^3$__ 30

The polymer was found to have a melt flow of 33.4 decigrams per minute at 44 p.s.i. and 220° C. (ASTM D1238–57T).

Example 4.—Thermoplastic polyhydroxyetherurea

A three-neck, round bottom 100 ml. flask was charged with 4.65 g. (0.015 mole) of dicarbonyl tripiperazine, 20.25 g. of ethanol and 27.0 g. of dimethylsulfoxide. After this mixture was stirred for 30 minutes, 4.00 g. (0.015 mole) of the diglycidylether of 1,4-cyclohexanedimethanol was added. The solution was stirred for four hours at reflux (88° C.). After coagulation in excess water and vacuum drying at 60° C., 8.0 g. (93% yield) of the polyhydroxyaminoetherurea was isolated. The polymer was soluble in pyridine and in formic acid. A reduced viscosity of 1.6 was found for a 0.2% solution of the polymer in formic acid at 25° C. Compression-molded (200° C. and 6,000 p.s.i.) films were clear, water-white, flexible and strong. The following physical properties of this polyhydroxyetherurea were determined:

Tensile modulus (ASTM D882–56T) ___p.s.i__ 160,000
Tensile strength (ASTM D882–56T) ____p.s.i__ 3,700
Elongation at break (ASTM D882–56T)
 percent__ 45
Pendulum impact (ASTM D256–56 modified)
 ft. lbs./in.$^3$__ 28
Glass transition temperature _____° C__ 50
Melt flow (220 p.s.i @ 240° C.) (ASTM 1238–57T) _____ decigrams per minute__ 0.96

Example 5.—Thermoplastic polyhydroxyetherthioether

The procedure described in Example 3 is followed substituting 6.96 g. (0.049 mole) of 1,4-benzenedithiol for the bisphenol A. A film forming, normally solid polymer is produced by this method.

Example 6.—Thermoplastic polyhydroxyetherester

The procedure described in Example 3 is employed with 8.1 g. (0.049 mole) of terephthalic acid in place of bisphenol A. A normally solid polymer is produced which can be pressed into films.

While the above examples are illustrative of the invention they are not to be construed as limitative thereof.

What is claimed is:

1. A normally solid thermoplastic copolymer having the formula

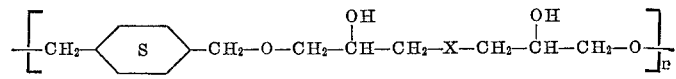

wherein X is a diamine radical derived from a linear piperazine carbonyl compound containing the

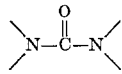

moiety, and $n$ is an integer having values of 2 to 80.

2. The copolymer claimed in claim 1 wherein the linear piperazine carbonyl compound is dicarbonyl tripiperazine.

3. Self-supporting films of the copolymer claimed in claim 2.

4. The film claimed in claim 3 prepared by compression molding.

References Cited

UNITED STATES PATENTS

| 3,177,089 | 4/1965 | Marshall et al. | 260—47 |
| 3,236,900 | 2/1966 | McConnell et al. | 260—2 |
| 2,599,974 | 6/1952 | Carpenter et al. | 260—47 |

WILLIAM H. SHORT, *Primary Examiner.*

T. D. KERWIN, *Assistant Examiner.*